United States Patent
Schmalz et al.

(10) Patent No.: US 10,262,200 B2
(45) Date of Patent: Apr. 16, 2019

(54) METHOD FOR EXAMINING A VALUE DOCUMENT, AND MEANS FOR CARRYING OUT THE METHOD

(71) Applicant: GIESECKE & DEVRIENT GMBH, München (DE)

(72) Inventors: Steffen Schmalz, München (DE); Shanchuan Su, Neubiberg (DE); Norbert Holl, Germering (DE)

(73) Assignee: GIESECKE+DEVRIENT CURRENCY TECHNOLOGY GMBH, Munich (DE)

(*) Notice: Subject to any disclaimer, the term of this patent is extended or adjusted under 35 U.S.C. 154(b) by 0 days.

(21) Appl. No.: 15/119,945

(22) PCT Filed: Feb. 18, 2015

(86) PCT No.: PCT/EP2015/000358
§ 371 (c)(1),
(2) Date: Aug. 18, 2016

(87) PCT Pub. No.: WO2015/124294
PCT Pub. Date: Aug. 27, 2015

(65) Prior Publication Data
US 2017/0061638 A1     Mar. 2, 2017

(30) Foreign Application Priority Data
Feb. 19, 2014   (DE) .................. 10 2014 002 273

(51) Int. Cl.
*G06K 9/00*     (2006.01)
*G07D 7/20*     (2016.01)
(Continued)

(52) U.S. Cl.
CPC ............ *G06K 9/00442* (2013.01); *G06T 7/11* (2017.01); *G07D 7/183* (2017.05); *G07D 7/20* (2013.01);
(Continued)

(58) Field of Classification Search
CPC .................. G06K 9/00442; G06T 7/11; G06T 2207/10004; G06T 2207/30176; G07D 7/183; G07D 7/20
See application file for complete search history.

(56) References Cited

U.S. PATENT DOCUMENTS

| | | | |
|---|---|---|---|
| 2008/0247630 A1* | 10/2008 | Horiuchi ............ | G01N 21/9501 382/141 |
| 2013/0272598 A1 | 10/2013 | Holl | |

(Continued)

FOREIGN PATENT DOCUMENTS

| | | |
|---|---|---|
| DE | 102004036229 A1 | 2/2006 |
| DE | 102012016828 A1 | 2/2014 |

(Continued)

OTHER PUBLICATIONS

German Search Report from corresponding German Application No. DE 10 2014 002 273.0, dated Sep. 18, 2014.

(Continued)

*Primary Examiner* — Edward Park
(74) *Attorney, Agent, or Firm* — Workman Nydegger

(57) ABSTRACT

There is described a method for examining a value document while employing a digital image of the value document which comprises pixels, wherein the image is examined for the presence of at least one irregularity relating to a pre-specified property of the value document, when such an irregularity is found an examination region representing the irregularity is fixed in dependence on the size and/or position and/or form of the irregularity in the image, and for (Continued)

checking the irregularity only a part of those pixels of the digital image that correspond to the examination region is employed.

14 Claims, 4 Drawing Sheets

(51) Int. Cl.
G06T 7/11 (2017.01)
G07D 7/183 (2016.01)
(52) U.S. Cl.
CPC ........... *G06T 2207/10004* (2013.01); *G06T 2207/30176* (2013.01)

(56) References Cited

U.S. PATENT DOCUMENTS

2013/0287264 A1* 10/2013 Chen .................. G07D 7/2016
382/112

2013/0311477 A1 11/2013 Hecht et al.
2015/0078627 A1* 3/2015 Fukase .................. G06T 7/001
382/112

FOREIGN PATENT DOCUMENTS

| EP | 1011079 A1 | 6/2000 |
|----|------------|--------|
| EP | 2355056 A1 | 8/2011 |
| EP | 2660787 A1 | 11/2013 |
| JP | H01124087 A | 5/1989 |
| WO | 2012084145 A1 | 6/2012 |
| WO | 2012084210 A1 | 6/2012 |

OTHER PUBLICATIONS

International Search Report from corresponding PCT Application No. PCT/EP2015/000358, dated May 8, 2015.

International Preliminary Report on Patentability from corresponding PCT Application No. PCT/EP2015/000358, dated Aug. 23, 2016.

* cited by examiner

METHOD FOR EXAMINING A VALUE DOCUMENT, AND MEANS FOR CARRYING OUT THE METHOD

BACKGROUND

The present invention relates to a method for examining a value document while employing a digital image of the value document which comprises pixels, and means for carrying out said method.

Value documents are understood here to be sheet-shaped objects that represent for example a monetary value and hence should not be manufacturable arbitrarily by unauthorized persons. They hence have features that are not simple to manufacture, in particular to copy, whose presence is an indication of authenticity, i.e. manufacture by an authorized body. Important examples of such value documents are coupons, vouchers, checks and in particular bank notes.

Such value documents are frequently to be checked as to whether they have pre-specified features or also defects. For checking the value documents by machine, value-document processing apparatuses are used. Such value-document processing apparatuses typically have optical sensors by means of which images of the value documents are captured. Said images can then be employed for checking whether the value document has certain features or also defects.

Due to the high resolution of modern optical sensors and the high processing speed of modern value-document processing apparatuses, it is important to be able to carry out the stated checks as quickly and efficiently as possible. This applies in particular to checks of defects whose form and extension are unknown prior to the check.

SUMMARY

The present invention is based on the object of providing a method for examining a value document while employing a digital image of the value document, and means for carrying out said method.

This object is achieved by a method according to claim 1, and in particular a method for examining a value document while employing a digital image of the value document which comprises pixels, wherein the image is examined for the presence of at least one irregularity relating to a pre-specified property of the value document, when such an irregularity is found an examination region representing the irregularity is fixed in dependence on the size and/or position and/or form of the irregularity in the image, and the irregularity is checked, wherein only a part of those pixels of the digital image that correspond to the examination region is employed.

The method according to the invention can be carried out in particular by means of an evaluation device which has a data processing device having at least one processor. The object is hence also achieved by a computer program with program code upon whose execution by means of at least one processor a method according to the invention is executed. A further subject matter of the present invention is also a physical data carrier on which a computer program according to the invention is stored. The at least one processor may be one or a plurality of processors which may be configured identically or differently.

In the method, there is employed a digital image of the value document which in particular can have been captured by means of a sensor. In the method, it suffices in principle that the digital image is present, for example in a storage device of an evaluation device employed for carrying out the method. However, it is preferred that, in the method, the digital image of the value document is captured while employing an optical sensor. The object is hence also achieved by an examination device for examining a value document having an optical sensor for capturing a digital image of the value document, and an evaluation device which is configured for carrying out a method according to the invention while employing a digital image captured by means of the optical sensor.

In particular, in the examination device, the evaluation device can have at least one processor and a storage in which a computer program according to the invention is stored, so that upon execution of the program code of the computer program by means of the processor a method according to the invention is carried out. Further, the evaluation device can also have an FPGA working together with the processor.

In the method, a digital image of the value document is employed. Said image has pixels which respectively correspond to a location in a capture region of an optical sensor employed for capturing the image. The image has a resolution which is determined at least partly by the local resolving power of the sensor and can in particular be given by the number of pixels in relation to a pre-specified area in the capture region. The pixels respectively have associated therewith pixel data which can comprise at least one image property of the respective pixel, for example a lightness or color coordinates in a color space, depending on the kind of image. Further, the digital image can be a remission image of the value document or a transmission image of the value document. Accordingly, the employed optical sensor can be a remission or transmission sensor. In both cases the sensor can be configured for capturing an image in only one wavelength region in the optical spectrum or in at least two different wavelength regions, preferably three colors.

In the method, there is checked a value document which can be of one or a plurality of pre-specified value-document types. If the value-document type is bank note, said type can be specified further by the currency, the denomination and, where applicable, the emission of the value document.

In the method, the image of the value document is first examined for the presence of at least one irregularity relating to a pre-specified property of the value document. An irregularity relating to a pre-specified property of the value document is understood within the context of the present invention to be in particular a deviation, present in the image or derivable therefrom, between the value document and a for value documents of the same value-document type relating to the pre-specified property.

Preferably, the pre-specified property of the value document can be its form. It can then be for example an irregularity of the form, i.e. a deviation of the form, establishable from the image, from a form pre-specified for the value document or a property pre-specified for value documents of the same value-document type.

When such an irregularity is found an examination region representing the irregularity is then fixed in dependence on the size and/or position and/or form of the irregularity in the image. The size and/or form and/or position of the examination region can be determined by the size and/or position and/or form of the irregularity and additionally the kind of irregularity. The examination region is preferably smaller than the image of the value document and in particular only as large as is necessary for further examination of the irregularity.

For checking the irregularity there is further employed only a part of those pixels of the digital image that correspond to the examination region. Thus, only very few pixels need to be employed for examining the irregularity: there is a restriction of the pixel number through the confinement to the examination region, on the one hand, and through the confinement to only a part of the pixels, on the other hand. Since only a part of the pixels is employed, without changing the pixel data for a respective pixel in dependence on pixel data of neighboring pixels, no additional computation effort arises.

Altogether a very high execution speed can thus be achieved, even when the images have a great number of pixels.

In principle, there can be employed as a pre-specified property any property of a value document that results from an image of the value document. Preferably, in the method, the pre-specified property of the value document is its form. The irregularity can then be a deviation from a form pre-specified for the value document, for example a rectangular form, being for example the lack of a corner or at least one edge that does not extend straight. The method is particularly suited for this property, since deviations of form usually occur on length scales that are distinctly greater than the area or superficial extent represented by a pixel and can hence be readily examined even at lower resolution.

For checking the irregularity it is not always necessary to employ only a part of the pixels that represent the examination region. Thus, in the method, only a part of those pixels that correspond to the examination region can preferably be employed upon checking the irregularity only when the size of the examination region or the number of pixels that represent the examination region exceeds a pre-specified limiting value for the size of the examination region or the number of pixels. The respective limiting value can be pre-specified in particular in dependence on the computing speed of the evaluation device and the time available for carrying out the method.

In the method, the irregularity is further checked after the examination region has been fixed. For the irregularity in the image can have different causes, which are preferably established. Hence it is preferably established upon checking the irregularity whether the irregularity corresponds to one of at least two possible value-document defects. The value-document defects are so constituted that they lead to an at least similar irregularity in an image upon a first, very simple check. Value-document defects are also understood here to be defects that do not represent any damage to the value document but can impair its suitability for machine processing or its fitness for use. For example, an irregularity consisting in the lack of a corner in the image of a rectangular value document can have at least two causes: a detached corner or a dog's-ear, i.e. folded-back corner. In this manner, the method can be employed for fast recognition of pre-specified value-document defects. The size and/or form and/or position of the examination region can be fixed in particular, inter alia, also in dependence on the kind of value-document defects.

In the method, the part of the pixels can in principle be chosen arbitrarily but in a suitable form for checking the irregularity. However, in the method, the part of the pixels of the digital image preferably forms an image of the examination region that is reduced in its resolution. This has the advantage that the image reduced in its resolution can be checked using methods as are also employed for other images.

Particularly preferably, in the method, the pixels of the digital image can correspond to locations on a rectangular grid, and the part of the pixels that is employed upon checking can lie on a subgrid of the rectangular grid. For example, the subgrid can have a grid constant, i.e. side length of a grid cell, that is twice as great as that of the original grid.

The method according to the invention can preferably be carried out by means of an apparatus for processing value documents. The subject matter of the present invention is hence also an apparatus for processing value documents having a feeding device for feeding single or singled value documents to be processed, an output device having at least one output portion for receiving processed value documents, a transport device for transporting single or singled value documents from the feeding device to the output device, and an examination apparatus according to the invention, wherein the optical sensor of the examination device is configured and adapted for capturing a digital image of the value document while it is being transported by means of the transport device. The evaluation device of the examination apparatus can preferably also form at least a part of a control device of the value-document processing apparatus, which then at least actuates the transport device in dependence on the result of the check.

BRIEF DESCRIPTION OF THE DRAWINGS

The invention will hereinafter be explained further by way of example with reference to the drawings. There are shown.

DETAILED DESCRIPTION OF VARIOUS EMBODIMENTS

Figure 1:
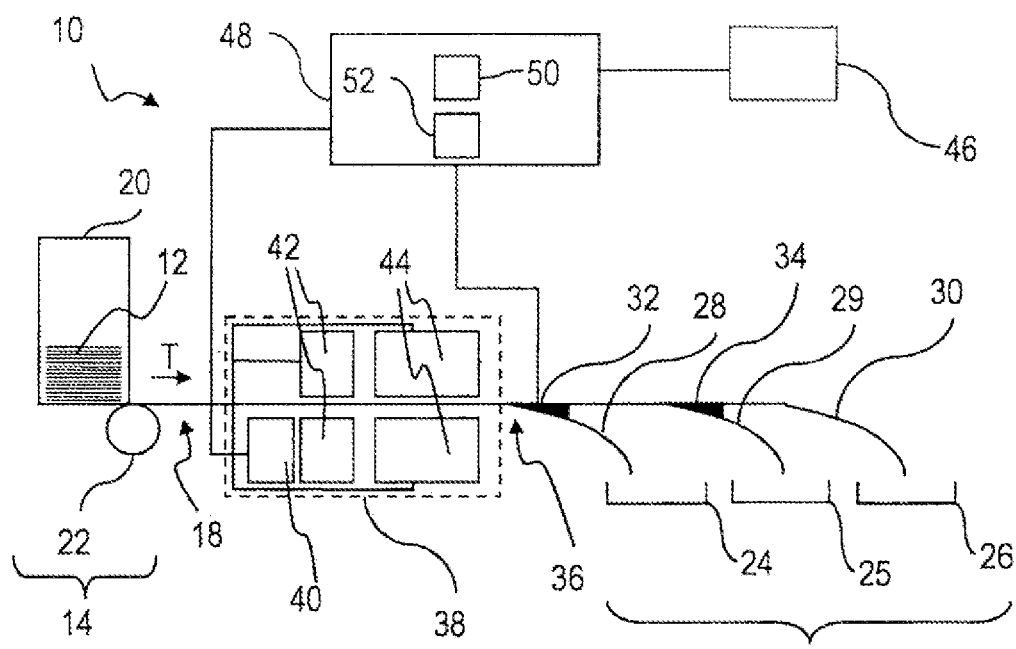
FIG. 1 a schematic view of a value-document processing apparatus in the form of a bank-note sorting apparatus, FIG. 2 a schematic representation of an image of a value document having a dog's-ear, FIG. 3 a simplified flowchart of a first embodiment of a method for examining value documents that is capable of being carried out by means of the apparatus in FIG. 1, FIG. 4 a schematic representation of a part of the image of the value document in FIG. 2 to illustrate steps of the method in FIG. 3, FIG. 5 a simplified flowchart of a step S16 of the method in FIG. 3, FIG. 6 a simplified flowchart of a second embodiment of a method for examining value documents that is capable of being carried out by means of the apparatus in FIG. 1, and FIG. 7A- 7B schematic representations of an image of a value document having a Z-fold in a view orthogonal to the area of the value document (A) and a view parallel to the area of the value document (B).

A value-document processing apparatus 10 in FIG. 1, in this example an apparatus for processing value documents 12 in the form of bank notes, is configured for sorting value documents in dependence on the recognition of the authenticity and the state of processed value documents. The hereinafter described components of the apparatus are arranged in a housing (not shown) of the apparatus or held on said housing, unless they are designated as external.

The apparatus has a feeding device 14 for feeding value documents, an output device 16 for receiving processed, i.e. sorted, value documents, and a transport device 18 for transporting singled value documents from the feeding device 14 to the output device 16.

The feeding device 14 comprises, in this example, an input pocket 20 for a value-document stack and a singler 22 for singling value documents out of the value-document stack in the input pocket 20 and for feeding the singled value documents to the transport device 18.

The output device 16 has, in this example, three output portions 24, 25 and 26 into which processed value documents can be sorted, being sorted according to the result of the processing. In this example, each of the portions comprises a stack pocket and a stacking wheel (not shown) by means of which fed value documents can be deposited in the stack pocket. In other embodiment examples, one of the output portions can be replaced by a device for destroying bank notes.

The transport device 18 has at least two, in this example three, branches 28, 29 and 30 at whose ends one of the output portions 24, 25, 26 is arranged in each case, and, at the branching points, gates 32 and 34, controllable by positioning signals, by means of which value documents are feedable to the branches 28 to 30 and thus to the output portions 24 to 26 in dependence on positioning signals.

On a transport path 36, defined by the transport device 18, between the feeding device 14, in this example more precisely the singler 22, and the first gate 32 after the singler 22 in the transport direction, is arranged a sensor device 38 which measures physical properties of value documents while the value documents are being transported past and forms sensor signals rendering the measuring results. In this example, the sensor device 38 has three sensors, namely, an optical remission sensor 40 which captures a remission color image and a remission IR image of the value document, an optical transmission sensor 42 which captures a transmission image and a transmission IR image of the value document, and a transmission ultrasonic sensor 44 which captures or measures as an ultrasound property the ultrasound transmission of the value document in a spatially resolved manner, and will hereinafter only be designated as an ultrasonic sensor for simplicity's sake. The sensor signals formed by the sensors correspond to measuring data or raw data of the sensors which, depending on the sensor, may have already been subjected to a correction, for example in dependence on calibrating data and/or noise properties.

For capturing and displaying operator control data, the value-document processing apparatus 10 has an input/output device 46. The input/output device 46 is realized in this example by a touch-sensitive display device ("touch screen"). In other exemplary embodiments it can comprise for example a keyboard and a display device, for example an LCD display.

A control and evaluation device 48 is connected via signal connections to the sensor device 38, the input/output device 46 and the transport device 18, in particular the gates 32 and 34.

The control and evaluation device 48 forms a data processing device and has, besides corresponding data interfaces (not shown in the figures) for the sensor device 38 or its sensors, a processor 50 and a storage 52 connected to the processor 50, in which at least one computer program with program code is stored. Upon execution of the computer program, the control and evaluation device 48 or the processor 50 evaluates the signals or measurement values of the sensor device 38 and controls the apparatus in accordance with the properties of the value documents. Thus, in its function as an evaluation device it can evaluate the sensor signals, in particular for establishing an authenticity class and/or a state class of a processed value document; in its function as a control device it can actuate the transport device 18 in accordance with the evaluation and optionally store the measuring data. In other embodiment examples, there can also be provided an evaluation device separate from the control device and connected via interfaces to the sensors of the sensor device 38, on the one hand, and the control device, on the other hand. The evaluation device is then configured for evaluating the sensor signals and delivers the respective result to the control device, which actuates the transport device. The hereinafter described evaluation operations can then be carried out solely by the evaluation device.

Further, the control and evaluation device 48 actuates the input/output device 46, inter alia, to display operator-control data, and captures via said device operator-control data which correspond to an operator's inputs.

During operation, value documents are singled out of the feeding device and transported past the sensor device 38 or therethrough. The sensor device 38 captures or measures physical properties of the value document respectively transported past or through it and forms sensor signals or measuring data which describe the measurement values for the physical properties. The control and evaluation device 48 classifies a value document into one of pre-specified authenticity and/or state classes in dependence on the sensor signals of the sensor device 38 for the value document and on classification parameters stored in the evaluation device, and so actuates the transport device 18, here more precisely the gates 32, 34, by emitting positioning signals, that the value document is outputted in accordance with its class established upon the classification into an output portion of the output device 16 that is associated with said class. The association with one of the pre-specified authenticity classes, or the classification, is effected here in dependence on at least one pre-specified authenticity criterion.

For checking value documents in the way described more precisely hereinafter, there are employed in particular transmission images captured by the transmission sensor 42. The transmission sensor 42 has an illumination portion by means of which a pre-specified capture region of the transport path can be illuminated with optical radiation in the visible and in a pre-specified infrared wavelength region. On the opposing side of the transport path 18 the transmission sensor 42 has a detection device for spatially resolved capture of an image in the wavelength region of visible light and of an infrared transmission image in the pre-specified infrared wavelength region.

Figure 2:
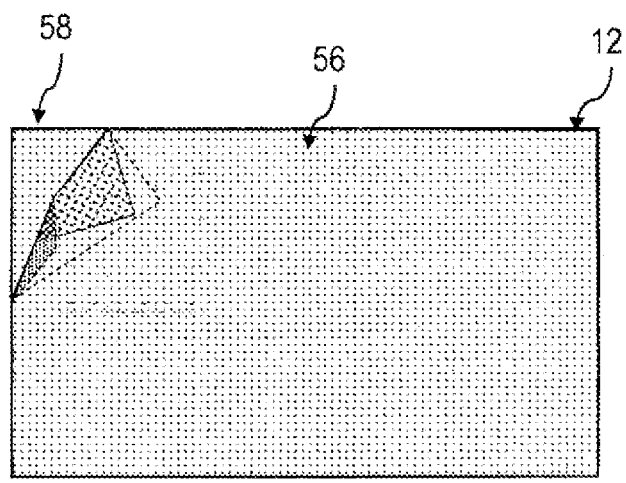

The transmission sensor 42 is configured as a line sensor which, during transport of the value document through the sensor, successively captures transmission line images of strips of the value document that extend transversely to the transport direction of the value document. Accordingly, the detection device comprises detector rows. The transmission sensor 42 joins together the captured line images into digital transmission images which comprise pixels whose properties are described by pixel data. In particular, it captures a digital transmission image of the value document while forming pixel data describing the pixels of the image, and transfers them to the evaluation device 48. The pixel data for a pixel describe in particular a lightness which describes the intensity received by the detection device for the pixel. The transmission sensor is so configured that the pixels respectively correspond to locations on a square grid. The length of the edges of a square amounts in this embodiment example to about 0.2 mm, so that the resolution amounts to about 125 dpi. Schematically and for better illustration, there is shown in FIG. 2 such a digital image of a value document 12 in which the pixels 56 are marked by black squares or dots at their center.

Figure 3:
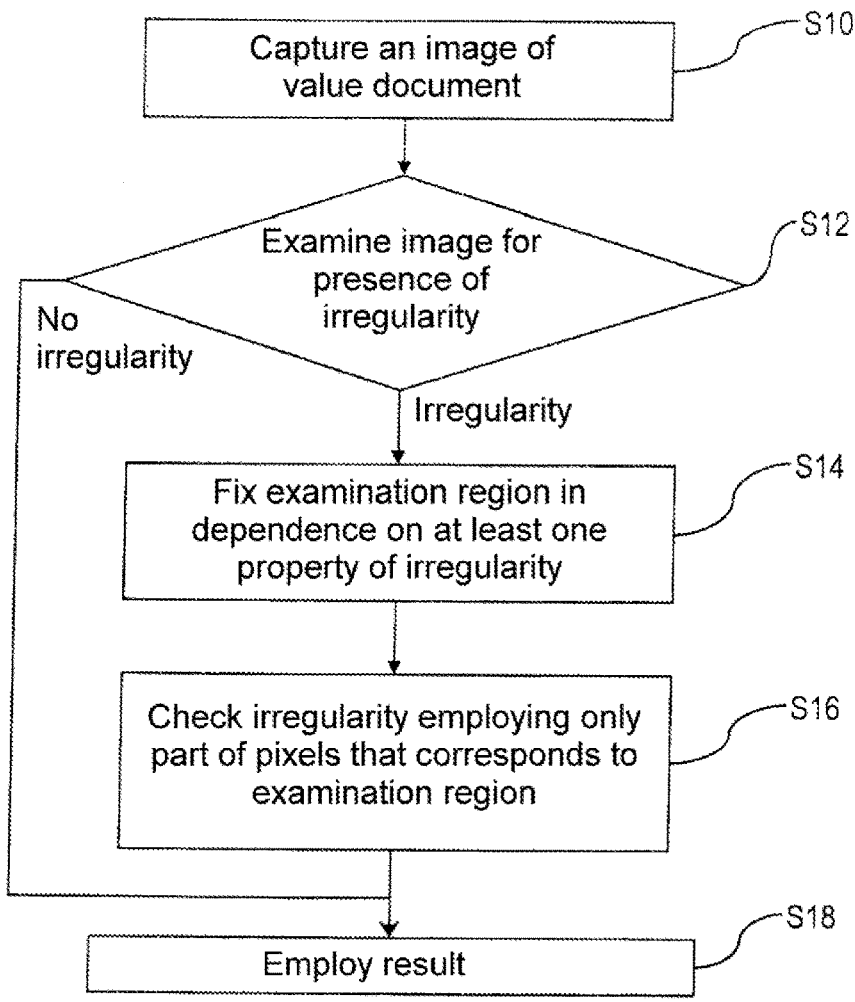

In the hereinafter described method for examining a value document as illustrated in FIG. 3, it will be assumed that the value documents being checked should have a rectangular form, i.e. are of a value-document type that is characterized, inter alia, by a rectangular form of the value documents. The image in FIG. 2 shows an irregularity relating to a pre-specified property of the value document, namely its form. More precisely, the upper left corner 58 in FIG. 2 seems to be missing, which can be due to a dog's-ear or to the corner having been torn off and now being gone.

For carrying out the method there is stored in the storage 52 a computer program with program code upon whose execution by means of the processor 50 the hereinafter described method is executed. The control and evaluation device 48 hence represents in particular also an evaluation device as intended by the present invention and, in combination with the transmission sensor 44, an examination device as intended by the present invention.

For examining a value document, there is first captured in step S10 by means of the sensor device 38, more precisely the transmission sensor 42, a transmission image of the value document which, as explained above, comprises pixel whose lightness values are given by corresponding pixel data.

In step S12 the image is examined as to whether an irregularity relating to a pre-specified property of the value document is present. In this embodiment example, the form is employed as the pre-specified property of the value document. More precisely, the property checked is that the form of the value document in the image must be a complete rectangle having four corners. For this purpose, there can first be established the smallest rectangle in which there are pixels with a lightness that differ from pixels representing the background in accordance with a pre-specified threshold value specific to the background without a value document.

It can then be established for each of the corners of the rectangle whether it represents an irregularity. For this purpose, a search can be done for column portions of pixels that extend parallel to a first one of the sides and that have consecutive pixels with a lightness that correspond to the background beginning with the rectangle's second side orthogonal to said first side and forming the corner of the rectangle. In FIG. 2 such column portions can extend for example approximately vertically. Such column portions can be searched for beginning at the respective first side of the rectangle and in a direction away from the first side. The column portions must have a minimum number of pixels that is given by the noise behavior of the sensor and the resolution; when fewer pixels are found, the search for column portions is discontinued.

The length of a found column portion adjacent to the first side and the position of the last found column portion having a pre-specified number of consecutive pixels with a lightness corresponding to the background along the second side define a rectangle that represents an irregularity. The corner of the rectangle and the end of the first column as well as the position of the last column fix a triangle which corresponds to a missing corner in the image of the value document.

If no irregularities are found for any of the corners, a signal is formed that displays that no irregularities on the corners are present. The method is then continued with step S18 in which the result that no irregularity relating to form was found is employed.

Otherwise, the following steps are carried out for each of the corners for which an irregularity was established. In FIG. 3 is represented only the case that only one corner was found.

In step S14 the evaluation device 48 fixes an examination region 60 (cf. FIG. 4) in dependence on at least one property of the found irregularity. More precisely, it fixes the examination region of the size, position and form of the found irregularity. In FIG. 3 the examination region 60 is marked by dashed lines. The examination region 60 is determined as follows. A first triangle is defined by the missing corner, given by the corresponding corner 62 of the smallest rectangle employed in step S12, and the bending points 64 and 66 at which the contour of the value document in the image bends at its edges. The examination region 60 is then the triangle that results by mirroring the first triangle on the connection line between the bending points 64 and 66.

Figure 4:
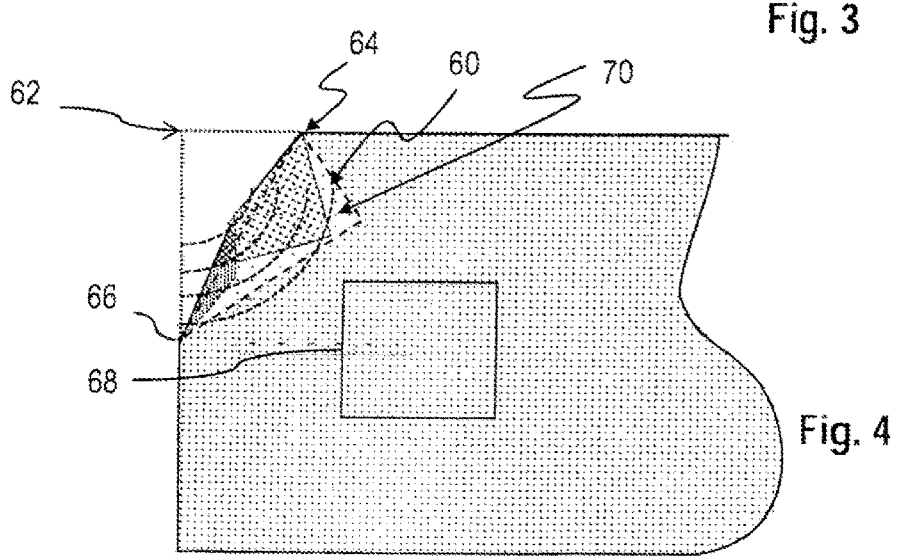

In step S16 the evaluation device checks the irregularity while employing only a part of the pixels that corresponds to the examination region. In this embodiment example, the resolution of the digital image is lowered by a pre-specified factor, in the example the factor 2, so that the part of the pixels of the digital image forms an image of the examination region that is reduced in its resolution. As illustrated in FIG. 4, this happens as follows: In the original image in FIG. 2 the pixels 56 or the locations corresponding to the pixels are arranged on a square grid. The part of the pixels that is only employed for checking the irregularity corresponds to locations in the examination region that lie on a square grid whose squares have an edge length that is twice as great as that of the squares of the grid for the captured image. One of said pixels is marked in FIG. 4 by the reference sign 70.

Figure 5:
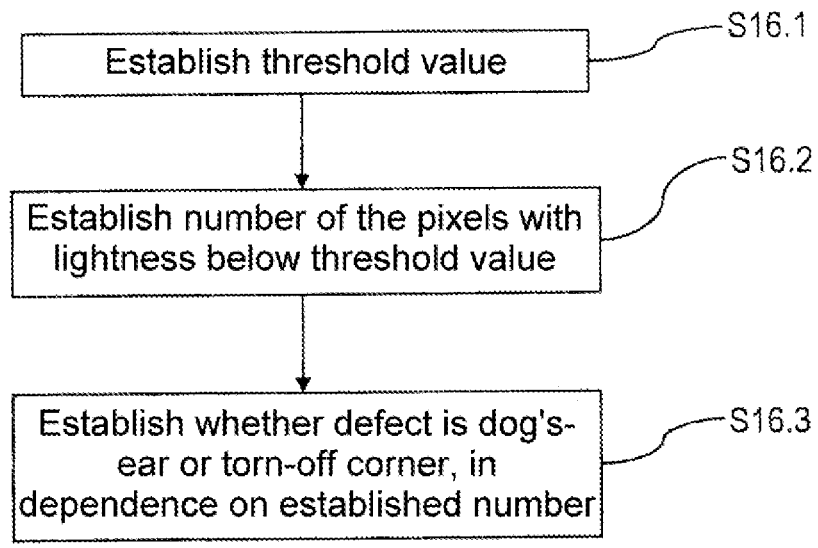

In the present case, the evaluation device 48 establishes upon checking the irregularity whether the irregularity corresponds to one of at least two possible value-document defects; in the present example the value-document defects yielding a similar irregularity in the image are the presence of a dog's-ear and the lack of the corner, for example because it was torn off The step S16 comprises substeps S16.1 to S16.3 which are illustrated in FIG. 5.

A dog's-ear is characterized in that two layers of the value document lie one over the other in the folded-down region and hence the transmission in this region is strongly reduced. With a torn-off corner, in contrast, the lightness in the imaged part of the value document should correspond to that of the undamaged value document.

In step S16.1 a threshold value is hence established for the further examination, said value corresponding to the average lightness of a pre-specified reference region 68 of the value document without holes or folds. As a threshold value there can be employed in particular the arithmetic average over the lightnesses of the pixels in the reference region. In the present example there is chosen as a reference region 68 a rectangle near the examination region 60, in which the lightness averaged over the pixels should correspond to that of the value document without folds.

In step S16.2 the evaluation device establishes the number of those pixels of the part of the pixels in the examination region that are assumed to be too dark. In the present example, it establishes for this purpose a histogram which renders the frequency of pixels that are too dark, i.e. pixels with a lightness below the threshold value, in the examination region as a function of the distance from the corner of the rectangle. For this purpose, the distance of the mirrored corner point from the corner point is established. This is understood to be the radius of a greatest circle. The interval between 0 and said distance is divided into a pre-specified number of equally long subintervals. The interval limits then correspond to radii of concentric circles around the corner point of the rectangle. Altogether a kind of ring structure results.

For each pixel to be examined in the examination region it is now established in which subinterval the distance of the pixel from the corner point of the rectangle lies and whether the lightness value undershoots the pre-specified threshold value. If the lightness value lies below the threshold value, a counter is increased by 1.

The evaluation device 48 compares the thus obtained histogram with a reference histogram. The reference histogram has the same number of bins as the established histogram and is pre-specified in dependence on the employed resolution of the examination region and the noise behavior of the employed sensors. For all bins or subintervals the number of pixels that are too dark in the established histogram is compared bin by bin with the number in the reference histogram. If the pixel number for the respective bin of the established histogram is greater than the corresponding number in the reference histogram, a total counter is increased. The total counter is then so scaled that it corresponds to a share of the total number of examined pixels, i.e. pixels in the examination region. The total counter is the relative number of pixels that are too dark with regard to the threshold value and the reference histogram.

In step S16.3 the evaluation device establishes in dependence on the established number whether the irregularity corresponds to a dog's-ear or a torn-off corner. For this purpose, it checks whether the relative number of pixels that are too dark exceeds a pre-specified limiting value. If this is the case, the presence of a dog's-ear is ascertained. Otherwise, the presence of a torn-off corner is ascertained.

The method is then continued with step S18 in which the result is employed, for example in order to establish the bank note's fitness for circulation.

A second embodiment example differs from the first embodiment example in that upon checking the irregularity only a part of the pixels of the examination region is only employed when the area of the examination region or the number of pixels therein exceeds a corresponding pre-specified limiting value. Otherwise, all pixels are employed.

Figure 6:
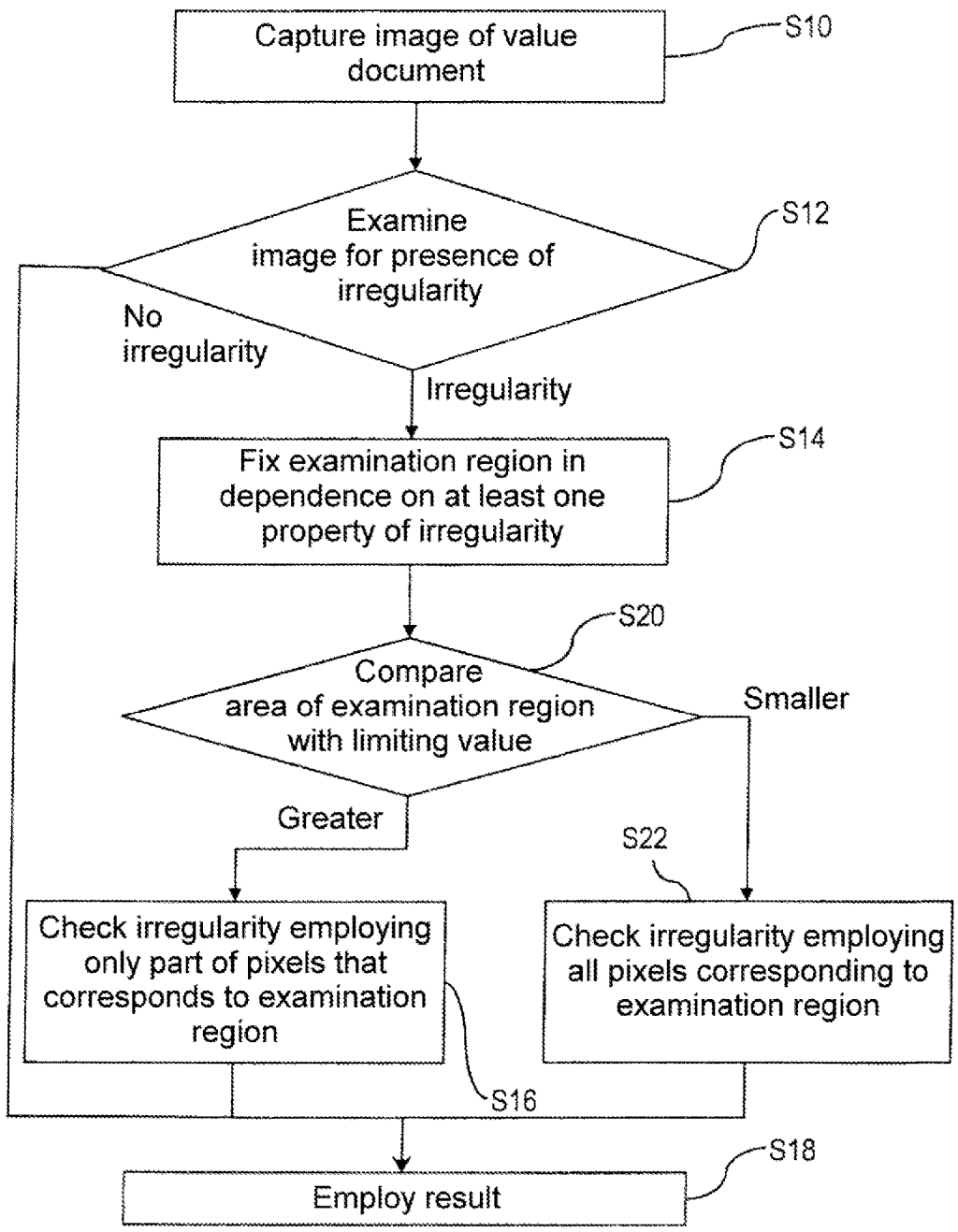

The method very schematically illustrated in FIG. 6 differs from the first embodiment example only by the steps S20 and S22, while the other steps are unchanged.

In the step S20 following step S14 the evaluation device 48 establishes an area of the examination region established in step S14 and compares it with a corresponding pre-specified limiting value for the area. In other embodiment examples, the evaluation device 48 can establish, instead of the area of the examination region 60, the number of pixels corresponding to the examination region and establish it with a corresponding limiting value for the pixel number. The limiting value here is pre-specified in dependence on the computing speed of the evaluation device and the time available for carrying out the method, and is stored in the evaluation device 48.

If the established area (or number) exceeds the limiting value, the method is continued as in the first embodiment example with the unchanged step S16.

Otherwise, the evaluation device 48 executes a method step S22 which differs from the step S16 solely in that now all pixels corresponding to the examination region 60 are employed, and not only a part.

A further embodiment example differs from the first embodiment example in that for checking the irregularity no histogram is employed as in the first embodiment example, but rather only the number of dark pixels in relation to the number of employed pixels of the image of the examination region that is reduced in resolution.

Figure 7A:
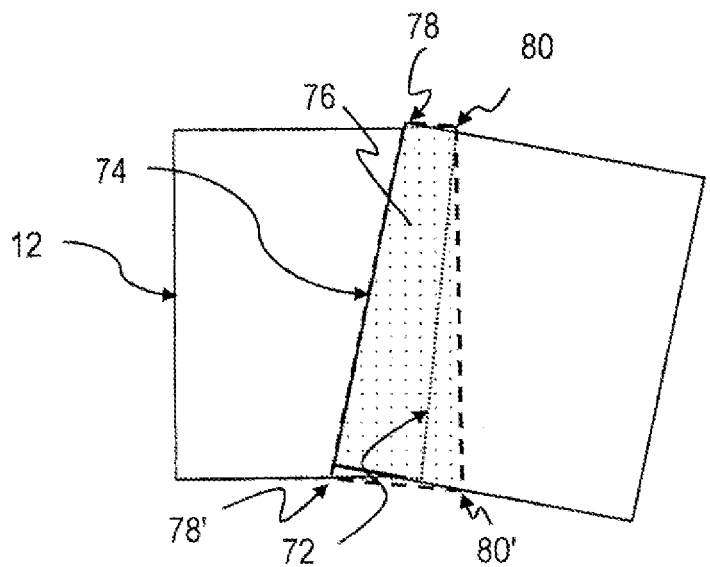
Figure 7B:
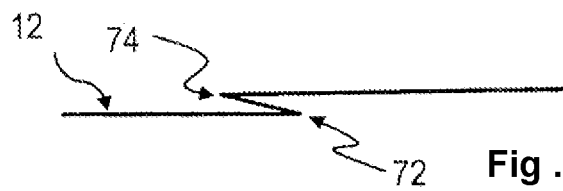

A further embodiment example differs from the preceding embodiment example in that only a check for an irregularity in the form of a Z-fold is carried out. This is illustrated in FIG. 7. The subpicture A shows a view of the area of the value document, the subpicture B a view parallel to the area of the value document or of the edge. A Z-fold is understood to mean that the value document is first folded back in a direction transverse to one of its edges along a line 72 and then folded forward along a further line 74 extending parallel to the line 72 or at an acute angle thereto. The irregularity could be due here to a Z-fold or an adhesive strip.

Here, too, an examination region 76 can be established in dependence on the position of bending points along the edges of the value document and the direction of the edges' portions that are separated by the bending points. The contour of said examination region 76 is shown by dashed lines in FIG. 7. The examination region can be given for example by a polygon whose corners the bending points 78, 80 along the edge that extends convexly and the intersection points 78' and 80' of the contour of the value document in the image and of straight lines through the bending points 78 and 80 that extend orthogonally to the edge portions, on whose extension the bending points lie.

In other embodiment examples, a color remission image can be employed, in which case the pixel data comprise color coordinates for the color of each pixel.

The invention claimed is:

1. A method for examining a value document while employing a digital image of the value document which comprises pixels,
   wherein the image is examined for the presence of at least one irregularity relating to a pre-specified property of the value document,
   when such an irregularity is found an examination region representing the irregularity is fixed in dependence on the size and/or position and/or form of the irregularity in the image, and the irregularity is checked,
   wherein of pixels of the digital image that correspond to the examination region only a part is employed in checking the irregularity, and
   wherein the part of the pixels of the digital image employed in checking the irregularity forms an image of the examination region that is reduced in its pixel resolution; and
   wherein the pixels of the digital image correspond to locations on a grid, and the part of the pixels that is employed upon checking lies on a subgrid of the grid, the subgrid having a pre-specified grid constant that is greater than that of the grid.

2. The method according to claim 1, wherein the pre-specified property of the value document is its form.

3. The method according to claim 1, wherein upon checking the irregularity only a part of those pixels that correspond to the examination region is employed only when the size of the examination region or the number of pixels that represent the examination region exceeds a pre-specified limiting value.

4. The method according to claim 1, wherein it is established upon checking the irregularity whether the irregularity corresponds to one of at least two possible value-document defects.

5. The method according to claim 1, wherein the digital image of the value document is captured while employing an optical sensor.

6. A computer program with program code upon whose execution by means of at least one processor a method according to claim 1 is executed.

7. A non-transitory computer readable medium on which a computer program according to claim 6 is stored.

8. An examination device for examining a value document having an optical sensor for capturing a digital image of the value document, and
   an evaluation device which is configured for carrying out a method according to claim 1 while employing a digital image captured by means of the optical sensor.

9. The examination device according to claim 8, wherein the evaluation device has at least one processor and a storage in which a computer program wherein the digital image of the value document is captured while employing an optical sensor is stored, so that upon execution of the program code of the computer program by means of the processor the a method for examining a value document is carried out while employing a digital image of the value document which comprises pixels, wherein the image is examined for the presence of at least one irregularity relating to a pre-specified property of the value document, when such an irregularity is found an examination region representing the irregularity is fixed in dependence on the size and/or position and/or form of the irregularity in the image, and the irregularity is checked, wherein only a part of those pixels of the digital image that correspond to the examination region is employed.

10. An apparatus for processing value documents having
    a feeding device for feeding single or singled value documents to be processed,
    an output device having at least one output portion for receiving processed value documents,
    a transport device for transporting single or singled value documents from the feeding device to the output device, and
    an examination apparatus according to claim 8,
    wherein the optical sensor of the examination device is configured and adapted for capturing a digital image of the value document while it is being transported by means of the transport device.

11. The method according to claim 1, wherein the at least one irregularity comprises a dog's-ear, a folded portion, or a detached portion.

12. The method according to claim 1, wherein the pixel resolution of the examination region is reduced by a pre-specified factor.

13. The method according to claim 1, wherein the examination region is fixed in dependence on a position of bending points along edges of the value document and the direction of portions of the edges that are separated by the bending points.

14. A method for examining a value document while employing a digital image of the value document which comprises pixels,
    wherein the image is examined for the presence of at least one irregularity relating to a pre-specified property of the value document,
    when such an irregularity is found an examination region representing the irregularity is fixed in dependence on the size and/or position and/or form of the irregularity in the image, and the irregularity is checked,
    wherein of pixels of the digital image that correspond to the examination region only a part is employed in checking the irregularity,
    wherein the irregularity is checked by a comparison of an intensity and location of the part of the pixels of the examination region with a threshold intensity determined from a reference region outside of the examination region,
    wherein the examination region is fixed in dependence on a position of bending points along edges of the value document and the direction of portions of the edges that are separated by the bending points.

* * * * *